United States Patent
Haggenmiller et al.

(10) Patent No.: US 9,985,531 B2
(45) Date of Patent: May 29, 2018

(54) SWITCHING REGULATOR FOR PRODUCING A PLURALITY OF DC VOLTAGES

(71) Applicant: CONTINENTAL AUTOMOTIVE GMBH, Hannover (DE)

(72) Inventors: Christoph Haggenmiller, Regensburg (DE); Thomas Franz, Nuremberg (DE); Walter Schrod, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days. days.

(21) Appl. No.: 15/220,639

(22) Filed: Jul. 27, 2016

(65) Prior Publication Data
US 2017/0033695 A1 Feb. 2, 2017

(30) Foreign Application Priority Data

Jul. 27, 2015 (DE) .......................... 10 2015 214 165

(51) Int. Cl.
*H02M 3/335* (2006.01)
*H02M 1/00* (2006.01)

(52) U.S. Cl.
CPC .... *H02M 3/33507* (2013.01); *H02M 3/33561* (2013.01); *H02M 2001/0025* (2013.01)

(58) Field of Classification Search
None
See application file for complete search history.

(56) References Cited

U.S. PATENT DOCUMENTS

| 5,917,716 A * | 6/1999 | Cho ..................... H02H 7/1227 348/E5.127 |
| 9,300,148 B2 * | 3/2016 | Oh ........................ H02J 7/0022 |
| 2007/0076514 A1 * | 4/2007 | Lu ..................... H02M 3/33592 365/230.06 |
| 2011/0188271 A1 | 8/2011 | Shinotsuka et al. |
| 2012/0161514 A1 * | 6/2012 | Choi ................. H02M 3/33561 307/17 |

FOREIGN PATENT DOCUMENTS

| DE | 10259353 A1 | 7/2004 |
| DE | 102012000683 A1 | 7/2013 |

OTHER PUBLICATIONS

Siemens: Control IC for Switched-Mode Power Supplies using MOS-Transistors, TDA 4605, Muenchen, 1994, Semiconductor Group, www.datasheetcatalog.com.

* cited by examiner

*Primary Examiner* — Jeffrey Gblende
(74) *Attorney, Agent, or Firm* — Laurence A. Greenberg; Werner H. Stemer; Ralph E. Locher

(57) ABSTRACT

A switching controller for the generation of a plurality of DC voltages includes an auxiliary secondary circuit in addition to a primary circuit and at least two main secondary circuits. Only the auxiliary secondary circuit is controlled by a control circuit. The auxiliary secondary circuit operates in a virtually powerless manner, wherein the time constant of a parallel circuit has a third output capacitor and an auxiliary load resistor is smaller than the average time constants of at least the first and second main secondary circuits, which are defined by the output capacitors thereof and the average rating values of the load resistors to be connected.

6 Claims, 3 Drawing Sheets

SWITCHING REGULATOR FOR PRODUCING A PLURALITY OF DC VOLTAGES

CROSS-REFERENCE TO RELATED APPLICATION

This application claims the priority, under 35 U.S.C. § 119, of German Application DE 10 2015 214 165.9, filed Jul. 27, 2015; the prior application is herewith incorporated by reference in its entirety.

BACKGROUND OF THE INVENTION

Field of the Invention

The description relates to a switching controller for the generation of a plurality of DC voltages with a first and a second input voltage terminal, between which a primary circuit comprised of at least a series arrangement of a primary coil and a first controllable switching means is connected, with at least a first and a second pair of output voltage terminals, with a first or a second terminal for a high output voltage potential and a first or second terminal for a low output voltage potential.

The switching controller is also provided with at least a first and a second secondary circuit, formed of a first or a second secondary coil, which are magnetically coupled respectively to the primary coil, wherein a respective first terminal of a secondary coil, via a first or a second diode, is connected to the first or second terminal for a high output voltage potential, and a respective second terminal of a secondary coil is connected to the first or second terminal for a low output voltage potential.

The series circuit comprised of a secondary coil and a diode is connected in parallel with a first or a second output capacitor. The second input voltage terminal, and at least one of the two terminals for a low output voltage potential, constitute a reference potential. A control circuit is provided, with one input and one output terminal, which connects the output terminal with a control terminal on the controllable switching means.

A circuit arrangement of this type is known from DE 102 59 353 A1.

In the generation of a plurality of output voltages by means of a switching controller, a problem arises, in that either all the output voltages must be regulated individually, with the corresponding complexity which this implies, or only one of the output voltages is regulated and the remaining voltages are locked-in to the latter voltage, with the consequence, however, that the unregulated output voltage(s) may decay earlier and, as a result of the excessively delayed action of the controller, may fall below their target service range, such that a connected load is not properly supplied.

DE 102 59353 A1 proposes that individual secondary circuits should be regulated by means of a controller in a time-division multiplexing arrangement. However, this arrangement is also associated with a not inconsiderable complexity of control.

BRIEF SUMMARY OF THE INVENTION

The object of the invention is therefore the proposal of a switching controller which, with limited complexity, delivers a stable output voltage under predefined conditions.

According to the invention, a generic switching controller is provided with an auxiliary secondary circuit with a first and a second terminal, between which the series circuit comprised of a third diode, polarized in the conducting direction, and a parallel circuit comprised of a third output capacitor and an auxiliary load resistor is connected. The first terminal of the auxiliary secondary circuit is connected to a first terminal of an auxiliary secondary coil, which is magnetically coupled to the primary coil, whereas the second terminal of the auxiliary secondary circuit is connected to a second terminal of the auxiliary secondary coil and to the reference potential. The connection point of the third diode and the parallel circuit comprised of the third output capacitor and the auxiliary load resistor is connected to the input terminal of the control circuit, wherein the time constant of the parallel circuit comprised of the third output capacitor and the auxiliary load resistor is smaller than the average time constants of at least the first and second secondary circuits, which are defined by the output capacitors and the average rating values of the load resistors to be connected.

Rating values for the auxiliary load resistor and the third output capacitor are selected such that the auxiliary secondary circuit can be operated in a virtually powerless manner. As a result of the small time constant, the output capacitor of the auxiliary secondary circuit discharges more rapidly than the output capacitors of the main secondary circuits such that, in normal operation, control is restored before the voltages on the outputs of the main secondary circuits have fallen below a value which would no longer permit the correct operation of a connected load in the stipulated manner.

By the virtually powerless operation of the auxiliary secondary circuit, no increased energy consumption results, and the auxiliary secondary circuit can be constructed of small and low-cost components in a simple and cost-effective manner.

In a first embodiment of the switching controller according to the invention, the auxiliary secondary coil is a third secondary coil, such that the auxiliary secondary circuit is a genuine secondary circuit.

In a further embodiment of the invention, however, one of the at least two further main secondary coils can also be employed as an auxiliary secondary coil such that, by this arrangement, one secondary coil can be omitted.

In another embodiment of the invention, the first terminal of the auxiliary secondary circuit is connected to the connection point of the diode, and the output capacitor of the secondary circuit is connected to the main secondary coil which serves as the auxiliary secondary coil.

Accordingly, control is only actuated if the output capacitor of this secondary circuit has fallen below a specific value, such that the output capacitor of the auxiliary secondary circuit can no longer be recharged via the third diode.

In an advantageous configuration of the switching controller according to the invention, at least one of the terminals for a low output voltage potential can carry a negative potential, in relation to the reference potential, whereby this switching controller can be employed in applications in which negative potentials are required, in addition to positive potentials, and particularly in which reference to a negative potential is required.

BRIEF DESCRIPTION OF THE SEVERAL VIEWS OF THE DRAWING

The invention is described in greater detail hereinafter on the basis of exemplary embodiments, with reference to the figures.

Herein.

DESCRIPTION OF THE INVENTION

Figure 1:
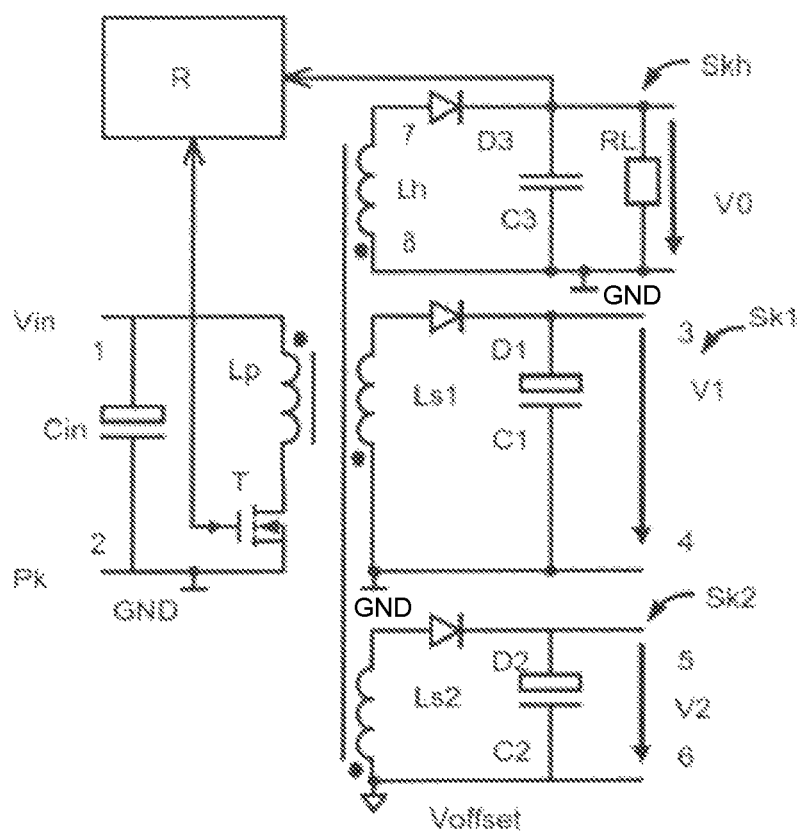
FIG. 1 shows a first embodiment of a switching controller according to the invention.
Figure 2:
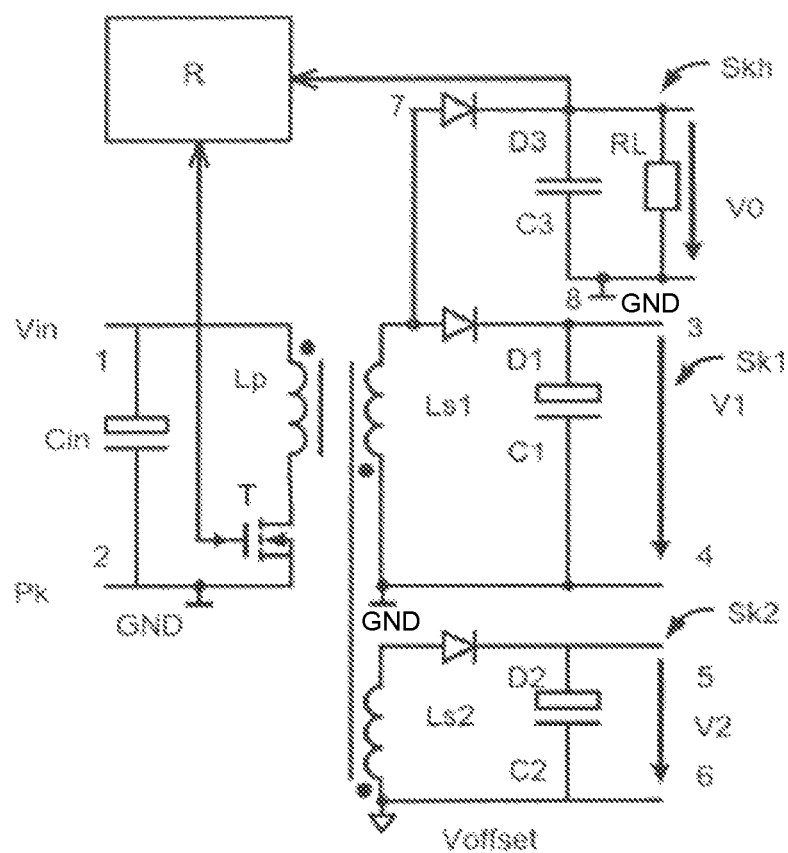
FIG. 2 shows a second embodiment of a switching controller according to the invention.
Figure 3:
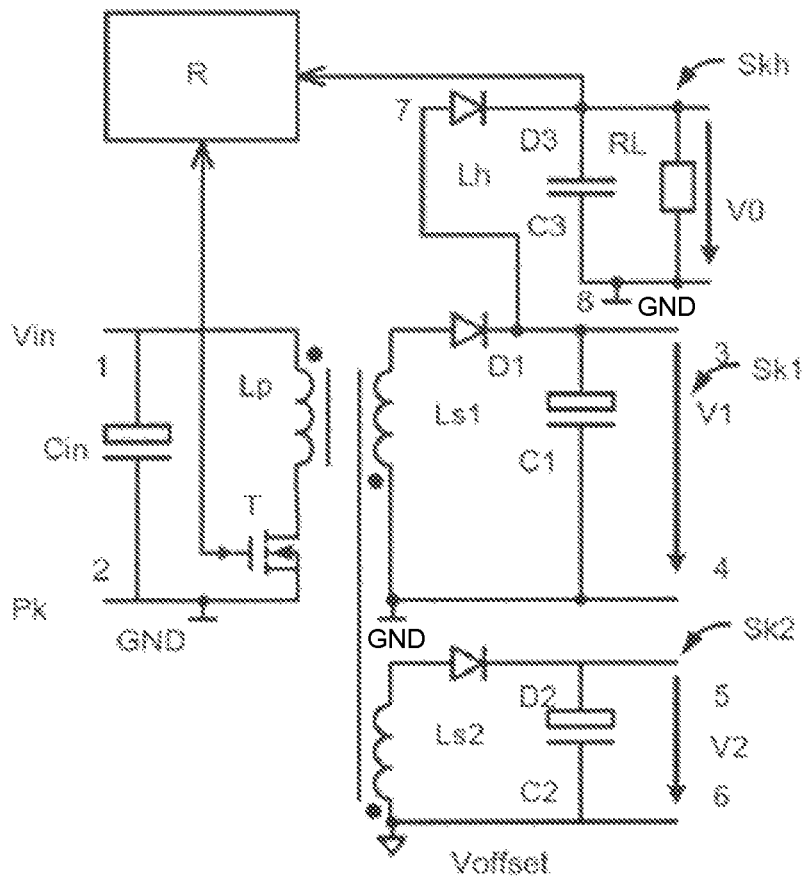
FIG. 3 shows a third embodiment of a switching controller according to the invention.

As common circuit components, FIGS. 1 to 3 respectively show a primary circuit Pk in which, between two input voltage terminals 1, 2, the series circuit comprised of a primary coil Lp and a switching element T which, in the example represented, is configured as a MOSFET, is connected. An input capacitor Cin for the stabilization of the input voltage Vin is connected in parallel with the series circuit comprised of the primary coil Lp and the switching element T. The potential on the second terminal 2 for the input voltage Vin is a reference potential GND.

On the secondary side, two secondary coils Ls1, Ls2 are magnetically coupled to the primary coil Lp of the primary circuit Pk, which are constituent elements of a first secondary circuit Sk1 and a second secondary circuit Sk2. The voltages induced in the secondary coils Ls1, Ls2 are applied respectively via diodes D1 or D2 to the output capacitors C1 or C2, whereby the latter are charged. On the output capacitors C1, C2, the output voltages V1, V2 are applied to respective output voltage terminals 3, 4 or 5, 6.

The second terminal 4 for a low output voltage potential on the first secondary circuit Sk1 is also connected to the reference potential GND whereas, in the exemplary embodiment represented, the second terminal 6 for a low output voltage potential on the second secondary circuit Sk2 is connected to a negative potential Voffset.

The switching controller with two output circuits Sk1, Sk2 represented in FIGS. 1 to 3, for example, with a variable input voltage of +6 to +36 volts, which is often available in automotive applications, can deliver two constant output voltages of +15 and −35 volts, wherein the second output voltage, with a value of −35 volts, also shows a potential difference in relation to a negative potential Voffset of −50 volts, such that an output voltage of 15 volts is available.

These output voltages are used for the control of power circuit-breakers, which are designed to switch voltages ranging from −50 to +200 volts, for example for the control of the latest generation of piezo driver output stages. These piezo driver output stages are used for the control of piezoelectric injection valves.

As a load for the secondary circuits Sk1, Sk2, according to the exemplary embodiment represented above, the inputs of power transistors are used, operating in pulsed mode, in order to permit the charging of the capacitances of the piezo actuators. Accordingly, the loading of the secondary circuits Sk1, Sk2 is highly variable, such that the output voltages V1, V2 of the two secondary circuits Sk1, Sk2 are subject to different fluctuations.

According to the invention, in order to ensure that the output voltages V1, V2, even under extreme load conditions, do not fall below a specific and predetermined value, an auxiliary secondary circuit Skh is provided, the first terminal 7 of which, via a third diode D3 and the parallel circuit comprised of an output capacitor C3 and an auxiliary load resistor RL, is connected to a second terminal 8. The second terminal 8 is thus connected to the reference potential GND, whereas the first terminal 7, via an auxiliary secondary coil Lh or Ls1, is magnetically coupled to the primary coil Lp of the primary circuit Pk.

The connection point of the third diode D3 with the parallel circuit comprised of the third output capacitor C3 and the auxiliary load resistor RL is connected to the input of a control circuit R, the output of which controls the control input of the switching element T on the primary circuit Pk.

Control is executed in a known manner, wherein the voltage on the third output capacitor C3 is compared with a reference voltage which is present in the control circuit R, and the switching element T is closed, if the voltage on the third output capacitor C3 falls below the reference voltage.

The auxiliary secondary circuit Skh is designed as a virtually powerless arrangement such that, according to the invention, the power which is transmitted from the primary circuit Pk to the auxiliary secondary circuit Skh is significantly lower than the power required by the main secondary circuits Sk1, Sk2.

The time constant of the parallel circuit comprised of the third output capacitor C3 and the auxiliary load resistor RL is thus smaller than the average time constant of the secondary circuits Sk1, Sk2, such that the control of the voltage on the third output capacitor C3 is actuated earlier than on the secondary circuits Sk1, Sk2. The voltage on the third output capacitor C3, on the grounds of its design rating value and the rating of the auxiliary load resistor RL, decays more rapidly, as the third output capacitor C3 is discharged more rapidly via the auxiliary load resistor RL than on the secondary circuits Sk1, Sk2.

By this arrangement, using simple and low-cost components C3, RL on the auxiliary secondary circuit Skh, a control function can be achieved, which ensures that the output voltages V1, V2 of the secondary circuits Sk1, Sk2 remain within a predetermined voltage range.

FIG. 1 represents a first embodiment of the auxiliary secondary coil Lh, which is configured as a genuine secondary coil, such that the auxiliary secondary circuit Skh constitutes a third secondary circuit.

According to FIG. 2, however, the first terminal of the auxiliary secondary circuit Skh can also be connected to the first terminal of the first secondary coil Ls1, thereby permitting the omission of an additional secondary coil Lh.

A further option for the connection of the first terminal of the auxiliary secondary circuit Skh is represented in FIG. 3, in which the first terminal of the auxiliary secondary circuit Skh is connected to the connection point of the first diode D1 with the first output capacitor C1 on the first secondary circuit Sk1.

In this variant, in the presence of a sufficient output voltage V1 on the first secondary circuit Sk1, the third output capacitor C3 on the auxiliary secondary circuit Skh can be recharged via the third diode D3, until the first output voltage V1 falls below the value of the reference voltage on the control circuit R, and the control function is actuated once more by the closing of the switching element T on the primary circuit Pk.

The invention claimed is:

1. A switching controller for a generation of a plurality of DC voltages, the switching controller comprising:
   first and second input voltage terminals;
   a primary circuit connected between said first and second input voltage terminals, said primary circuit including at least a series configuration of a primary coil and a first controllable switching device having a control terminal;

at least a first and a second pair of output voltage terminals, each of said first and second pair of output voltage terminals including a first terminal for supplying a high output voltage potential and a second terminal for supplying a low output voltage potential;

at least a first secondary circuit formed of a first secondary coil being magnetically coupled to said primary coil and a second secondary circuit formed of a second secondary coil being magnetically coupled to said primary coil, said first secondary coil including a first terminal and a second terminal, and said second secondary coil including a first terminal and a second terminal;

said first secondary circuit including a first diode connecting said first terminal of said first secondary coil to said first terminal for supplying a high output voltage potential of said first pair of output voltage terminals, said second terminal of said first secondary coil connected to said second terminal for supplying a low output voltage potential of said first pair of output voltage terminals;

said second secondary circuit including a second diode connecting said first terminal of said second secondary coil to said first terminal for supplying a high output voltage potential of said second pair of output voltage terminals, said second terminal of said second secondary coil connected to said second terminal for supplying a low output voltage potential of said second pair of output voltage terminals;

said first secondary circuit including a capacitor connected between said first pair of output voltage terminals, and said second secondary circuit including a capacitor connected between said second pair of output voltage terminals;

said second input voltage terminal and at least one terminal selected from the group consisting of said second terminal of said first secondary circuit and said second terminal of said second secondary circuit forming a reference potential;

an auxiliary secondary coil being magnetically coupled to said primary coil;

an auxiliary secondary circuit having a first and a second terminal, a series circuit including a third diode, polarized in a conducting direction, and a parallel circuit including a third output capacitor and an auxiliary load resistor being connected between said first terminal of said auxiliary secondary circuit and said second terminal of said auxiliary secondary circuit;

a control circuit having one input and one output terminal connecting said first terminal of said auxiliary circuit with said control terminal of said first controllable switching device;

said first terminal of said auxiliary secondary circuit being connected to said auxiliary secondary coil;

said second terminal of said auxiliary secondary circuit being connected to said auxiliary secondary coil and to said reference potential;

a connection point of said third diode and said parallel circuit including said third output capacitor and said auxiliary load resistor being connected to said input terminal of said control circuit; and a time constant of said parallel circuit including said third output capacitor and said auxiliary load resistor being smaller than average time constants of at least said first and second secondary circuits;

wherein said auxiliary secondary circuit does not have output terminals for supplying an external load.

2. The switching controller according to claim 1, wherein said auxiliary secondary coil is a third secondary coil.

3. The switching controller as according to claim 1, wherein said auxiliary secondary coil is one of the at least two secondary coils.

4. The switching controller as according to claim 3, wherein said first terminal of said auxiliary secondary circuit is connected to said connection point of said third diode, and said third output capacitor of said secondary circuit is connected to said auxiliary secondary coil.

5. The switching controller according to claim 1, wherein a terminal selected from the group consisting of said second terminal of said first secondary circuit and said second terminal of said second secondary circuit carries a negative potential, in relation to said reference potential.

6. The switching controller according to claim 1, wherein components of said auxiliary secondary circuit are dimensioned such that a power transmission capacity from said primary circuit to said auxiliary secondary circuit is substantially smaller than power transmission capacities from said primary circuit to said first and second secondary circuits.

* * * * *